(12) United States Patent
O'Connor et al.

(10) Patent No.: US 7,212,624 B2
(45) Date of Patent: May 1, 2007

(54) USING INFORMATION ABOUT SOFTWARE EVENTS TO ROUTE CONTACTS IN A CONTACT CENTER

(75) Inventors: Neil O'Connor, Galway (IE); Thomas Moran, Galway (IE)

(73) Assignee: Nortal Networks Limited, St. Laurent (CA)

( * ) Notice: Subject to any disclaimer, the term of this patent is extended or adjusted under 35 U.S.C. 154(b) by 686 days.

(21) Appl. No.: 10/253,145

(22) Filed: Sep. 24, 2002

(65) Prior Publication Data

US 2004/0057572 A1  Mar. 25, 2004

(51) Int. Cl.
*H04M 3/00* (2006.01)
(52) U.S. Cl. .................... 379/265.09; 379/265.02; 379/266.01
(58) Field of Classification Search ............. 379/88.17, 379/265.02, 265.09, 265.12, 266.01, 266.02
See application file for complete search history.

(56) References Cited

U.S. PATENT DOCUMENTS

| | | | |
|---|---|---|---|
| 6,493,447 B1 * | 12/2002 | Goss et al. ............ | 379/265.09 |
| 6,661,889 B1 * | 12/2003 | Flockhart et al. ...... | 379/265.05 |
| 6,668,286 B2 * | 12/2003 | Bateman et al. ............... | 710/6 |
| 6,771,765 B1 * | 8/2004 | Crowther et al. ...... | 379/265.09 |

* cited by examiner

*Primary Examiner*—Bing Q. Bui
(74) *Attorney, Agent, or Firm*—Barnes & Thornburg LLP (57) ABSTRACT

A need exists to provide software support in a simple and effective manner over long periods of time. At the same time there is a need to allow contact centers to route calls appropriately when those calls relate to complex software support queries. This needs to be achieved without requiring complex call routing methods and apparatus at the contact center. The present invention addresses these problems by using software error codes or the like to route calls in a contact center.

18 Claims, 4 Drawing Sheets

SNMP Mappings

Figure 1

Figure 2: Email Scenario

Figure 3: Web transaction

Figure 4: Sip call to contact Centre

```
        ⎧ try
        ⎪ {
   50   ⎨   // Application code                    51
        ⎪   [.....]
        ⎪   throw(SeriousProblem);          52
        ⎩ }
        ⎧ catch (Exception SeriousProblem)
        ⎪ {
        ⎪   // Do some standard handling.
        ⎪   cout << "Critical Error : " << SeriousProblem->describe() << endl;  ⎫ 54
   53   ⎨   logFileWrite(ERRCODE_X, SeriousProblem->describe());                 ⎭
        ⎪   // Now notify the Alarm Routing Engine.
        ⎪   NotifyRoutingEngine( SeriousProblem->describe(),                    ⎫ 55
        ⎪   THIS_MODULE_IDENTIFIER);                                             ⎭
        ⎪   return 1;
        ⎩ }
```

Figure 5

Figure 6. SNMP Mappings

USING INFORMATION ABOUT SOFTWARE EVENTS TO ROUTE CONTACTS IN A CONTACT CENTER

FIELD OF THE INVENTION

The present invention relates to a method and apparatus for using information about software events to route contacts in a contact center.

BACKGROUND TO THE INVENTION

Call centers are known in which incoming calls are routed to one of a plurality of agents. For example, the call center might provide help desk facilities for a particular group of products and customers who are able to call in and be allocated to an agent who has the necessary skills to deal with his or her query. Each agent has one or more skills, for example, a particular agent has knowledge about sales for product X and about technical support for product Y. An incoming call is received and information from that call used by the call center, together with information about the agents, in order to route the incoming call to an agent with the appropriate skill. For example, an interactive voice response system (IVR system) may be used to find out what type of agent skill is required. Associated with each skill is a queue into which incoming calls are placed until an agent with that skill becomes available.

The terms "call center" and "contact center" as used herein are not intended to be restricted to situations in which telephone calls are made to the center. Other types of call or contact are also envisaged, such as email, fax, SMS, chat, web access and any other suitable method of contact including conventional telephone calls and voice over internet protocol telephone calls. Similarly, the terms "call" and "contact" as used herein are not intended to be restricted to conventional telephone calls but include contacts made by email, fax, voice over IP and any other suitable medium.

As volumes of traffic increase to call centers and as the number of different agent skills increases the complexity of routing incoming calls to the appropriate queues also increases, This is a particular problem for call centers that provide technical support, for example, for software products. In that situation the agent skills required are highly specialised, the agents themselves being software design or support engineers with knowledge about particular aspects of software products. If the customer has a software support issue the information needed from that customer in order to most appropriately route an incoming call from that customer is significant. If an IVR system is used as described above then the menu structure of the IVR system is necessarily complex in order to obtain the information needed to route the call most appropriately. This is problematic both for the customer and for the provider of the call center. The customer experiences a lengthy and complex interface before being able to speak to an actual agent; and the call center provider has to establish and maintain a complex and expensive IVR or other system for routing incoming calls.

There are also many situations in which software applications provide critical services or in which software providers have entered into support contracts with their customers. In these situations the software provider needs to have a quick and effective way of dealing with support queries from the customer and to provide this service over long time periods, often making support available 24 hours a day 7 days a week. Software support providers need an effective, simple and cost effective way in which this can be achieved.

Providers of computer hardware have considered the problem of how to create a hardware computer system that is continuously available despite hardware errors. For example, Stratus Technologies (trade mark) describe fault-tolerant servers and other hardware architectures which they provide on their web site at www.stratus.com. They describe how during operation of a Stratus system, processing proceeds in parallel on duplexed hardware. Checks are made for hardware errors at every machine clock cycle. If a hardware fault is detected then the faulty component is stopped and a partner component comes into operation to replace that faulty component. They also describe reporting the fault automatically to a customer assistance center. A replacement component is then dispatched via overnight delivery to the customer.

An object of the present invention is therefore to provide an improved method and apparatus for using information about software events to route contacts in a contact center which overcomes or at least mitigates one or more of the problems noted above.

Further benefits and advantages of the invention will become apparent from a consideration of the following detailed description given with reference to the accompanying drawings, which specify and show preferred embodiments of the invention.

SUMMARY OF THE INVENTION

As mentioned above there is a need to provide software support in a simple and effective manner over long periods of time. At the same time there is a need to allow contact centers to route calls appropriately when those calls relate to complex software support queries. This needs to be achieved without requiring complex call routing methods and apparatus at the contact center. The present invention addresses these problems by using software error codes or the like to route calls in a contact center.

The invention uses a linkage, association or mapping between software error codes (or the like) and skillsets or agents in a contact center. This linkage enables a high quality of software support to be provided because the most appropriate agents in the contact center is obtained directly without the need for the software support query to be processed by lengthy and complex analysis means (e.g. interactive voice response) until the required skillset is identified. The software support query is likely to be complex and also the skills of different agents at the contact center are highly specialised and different from one another. In such situations the mapping or linkage between software error codes and the like and skillsets is very advantageous because it enables incoming queries to the contact center to be quickly routed to the most appropriate agent. Thus in one example, skillsets comprise software error codes or module identifiers.

There are several ways in which the linkage, association or mapping can be provided. For example, it can be manually configured at the contact center or at an alarm routing engine as described below. In another case the information about software error codes and the like is automatically exported from every new release of the software. It is then automatically sent to the contact center or alarm routing engine.

According to an aspect of the present invention there is provided, in a contact center comprising a plurality of skillsets each with an associated queue, a method of automatically routing an incoming contact to one of the queues, said method comprising the steps of:

receiving the incoming contact, said contact being associated with a software application and comprising information about an event that has occurred during execution of that software application;

routing the incoming contact to one of the queues on the basis of the information about the event.

This provides the advantage that the incoming contact is quickly and easily routed to an appropriate skillset queue without the need for a complex routing system at the contact center. For example, an IVR system with a menu system of many levels is not required at the contact center despite the fact that the incoming contact relates to a complex situation such as an error in a software application. This type of method can be advantageously used by software providers to ensure that high levels of software support are provided to customers in a simple, cost-effective and fast manner.

Preferably the information about the event comprises a software error code. This provides the advantage that existing software applications that generate software error codes can be used in conjunction with the invention without the need for modification.

In another example the information about the event comprises a software module identifier. The software module identifier specifies which part of the software application experienced the event such as a fault or error. In this case, different skillsets at the contact center are provided to deal with queries and incoming contacts about particular software modules.

Preferably the routing step further comprises accessing a pre-specified mapping between the queues and information about events that may occur during execution of the software application. This mapping enables the contact center to quickly and easily determine which queue to route an incoming contact to.

In one embodiment the pre-specified mapping is provided by the software application. For example, as new upgrades of the software application are installed at a customer location, details of what software modules or software error codes map to which skillsets at the contact center can be pre-specified in the software upgrade and automatically sent from the newly installed software at the customer site to the contact center, This ensures that the mapping at the contact center is always up to date without the need for manual configuration at the contact center.

The incoming contact comprises a communications message in a form selected from: email, a web-based communications message, a session initiation protocol communications message, fax, a conventional telephone call, a voice over internet protocol telephone call and a text message. In this way any suitable type of medium can be used to send the contact to the contact center.

In one embodiment the incoming contact comprises an extensible mark-up language (XML) file, and the method further comprises     parsing said XML file using an XML parser at the contact center;

executing pre-specified methods on the basis of the results of the XML parsing process and a SAX interface at the contact center.

This provides the advantage that the process is further automated. The SAX interface enables the pre-specified methods to be carried out automatically. For example, these pre-specified methods can be to route the incoming contact to a particular skillset based on the information about the event. They can also be used to implement different levels of service for different customers as described in more detail below.

Preferably the method further comprises sending information about the event from the contact center to an associated problem report system. This provides the advantage that the problem report system is updated automatically and there is no need for an agent or other operator to input the information into that system separately. This helps software providers to keep track of problems reported by customers and steps that have been taken to address those problems.

Preferably the incoming contact comprises information selected from: information about a time when the event occurred, information about a time zone in which the software application exists, information about a customer location at which the software application is provided, address information of the software application, a stack trace and a screen capture. This information is then provided to an agent in the contact center in order to assist that agent in addressing any software problem or other issue as a result of receipt of the contact request.

In one embodiment the method further comprises establishing a two-way communication session with an entity from which the incoming contact was received. For example, this can be a session initiation protocol (SIP) communication session. An advantage of using a two-way communication session in this way is that the contact center is able to actively request information about the software application and its environment at a customer location. Also, remote maintenance of the entity from which the incoming contact was received can be carried out using the two-way communication session.

According to another aspect of the invention there is provided, a contact center comprising:

a plurality of skillsets each with an associated queue;

an input arranged to receive an incoming automatic contact, said contact being associated with a software application and comprising information about an event that has occurred during execution of that software application;

a routing engine arranged to route the incoming contact to one of the queues on the basis of the information about the event.

According to another aspect of the invention there is provided a method of automatically sending a contact request to a contact center said method comprising the steps of:

obtaining information about an event that has occurred during execution of a software application;

forming a contact request comprising said obtained information about the event; and     sending said contact request to a pre-specified contact center.

For example, this method can be carried out by the software application itself provided that the software application is pre-arranged to do this. In another embodiment this method is carried out by an alarm routing engine arranged to be connected to the software application. That provides the advantage that existing software applications that generate software error codes or the like can be used in conjunction with the method by adding an alarm routing engine at the customer location.

According to another aspect of the present invention there is provided an alarm routing engine arranged to automatically send a contact request to a contact center, said alarm routing engine comprising:

an input arranged to obtain information about an event that has occurred during execution of a software application;

a processor arranged to form a contact request comprising said obtained information about the event; and an output arranged to send the contact request to the contact center.

The invention also encompasses a computer program arranged to control a contact center in order to carry out the appropriate method described above and a computer program arranged to control an alarm routing engine in order to carry out the relevant method mentioned above.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Embodiments of the present invention are described below by way of example only. These examples represent the best ways of putting the invention into practice that are currently known to the Applicant although they are not the only ways in which this could be achieved.

The term "software error code" is used to refer to an identifier which is output by a computer program in the event that an error, fault, or other specified event occurs in that computer program. Typically a plurality of such identifiers can be output by a computer program and each identifier is associated with a particular part of the program or with a particular type of error, fault or event.

Existing computer programs typically already comprise software error codes because this is a conventional technique used to assist in debugging and maintenance of computer software. The present invention is arranged to operate with such existing computer programs or to operate with computer programs particularly prepared to provide software error codes suited for use with the invention.

The software itself which generates the software error codes for use with the invention may be used as a stand alone application, may be server-based or may be provided in any other suitable manner. In the situation that the software is server-based then a plurality of client terminals using the server-based application will be affected by a software error at the server. In this case the present invention is particularly useful because many users are affected by the software problem The examples described below therefore refer to the software application as being server-based. However, this is not essential.

Figure 1:
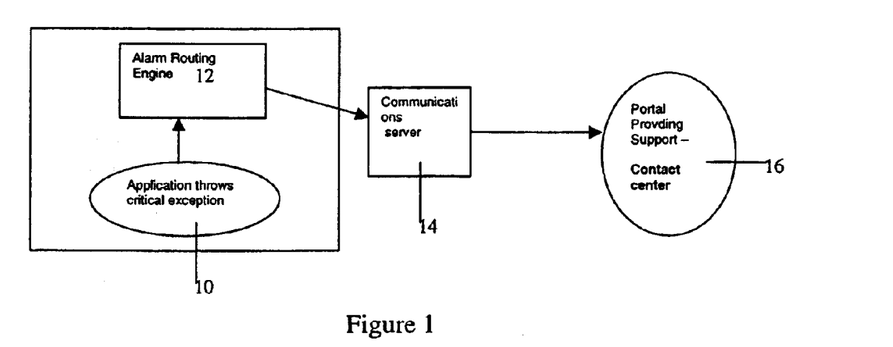
FIG. 1 is a schematic diagram of a software application and a contact center arranged to provide the present invention.

FIG. 1 is a schematic diagram of how software error codes are used in the present invention to route calls to a contact center. A software application 10 throws a critical exception. This means that the software application experiences an error, fault or other event that triggers the output of a software error code. The software error code is output to an alarm routing engine 12. This alarm routing engine may be integral with the software application itself or may be separate but in communication with the software application 10.

The function of the alarm routing engine comprises generating a communications message containing information about the software error code and optionally additional information, for example, about the customer site at which the software application is used. The communications message is formed in a suitable medium and format for sending to a contact center 16 via a communications server 14 if necessary. That is, the communications server 14 is not essential; the alarm routing engine 12 can be arranged to generate a communications message for sending directly to a contact center 16.

The contact center 16 preferably has access to a pre-specified mapping of software error codes to agent skillsets. A skillset is a list of skills that all agents serving a particular queue should have. The contact center 16 receives the communications message from the communications server 14 or alarm routing engine 12 and extracts the software error code and any other relevant information. Using the software error code, the pre-specified mapping and any other appropriate information (e.g. about the current availability of agents), the contact center 16 is then able to route the incoming communications message to a suitable queue.

In another embodiment the pre-specified mapping between software error codes and skillsets is accessible to the alarm routing engine 12. In that case, the alarm routing engine 12 generates a communications message containing information about the skillset associated with the software error code. When the contact center 16 receives this information it is then able to route the incoming communications message to an appropriate queue using the skillset information from the message itself.

The communications message sent from the alarm routing engine 12 to the contact center 16 may be of any suitable type. For example, email, tax, web-based message, conventional telephone call, voice over internet protocol (VOIP) call, or other suitable type.

Figure 2:
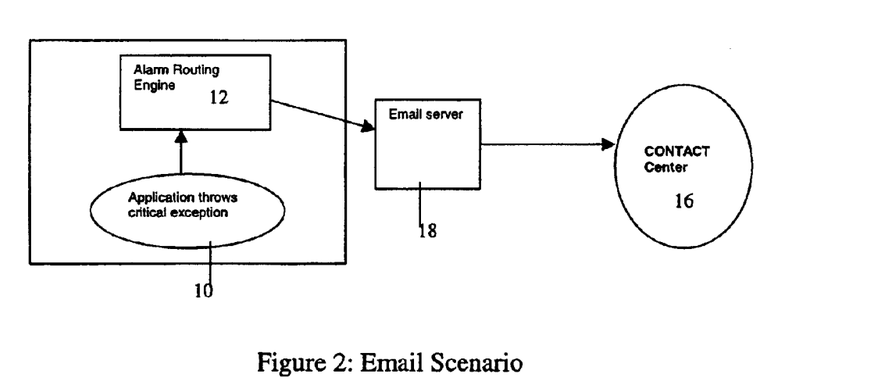
FIG. 2 is a schematic diagram of the arrangement of FIG. 1 in the case that email messages are used to contact the contact center.

FIG. 2 illustrates an embodiment where the communications message is an email and the communications server 14 is an email server 18. In this example the alarm routing engine 12 comprises an email client that is arranged to generate an email message. When the software application 10 experiences an error, fault or other specified event a software error code is generated by that software application 10 and sent to the alarm routing engine 12. In a preferred embodiment the software application 10 also sends a module identifier together with the software error code. This module identifier indicates which software module the error, fault or other event occurred in. That is, the software application comprises a plurality of software modules.

The alarm routing engine 12 proceeds to generate the email message and in a preferred example this contains the following information:

a system identifier which identifies the customer installation at which the software application is provided;

the software error code from the software application;

a software module identifier from the software application and indicating which software module the error, fault or other event occurred in;

a time stamp indicating at what time the error, fault or other event occurred;

a time zone indicating the time zone of the customer installation;

address information to enable the contact center to access the customer installation for the purposes of diagnostics, remote investigation etc. This can be an internet protocol (IP) address, universal resource locator (URL), modem telephone number or other suitable address.

a screen capture showing a display screen at the customer installation at the time the software error, fault or other event occurred;

a stack trace or other debugging information.

Of this information, only the software error code, software module ID, screen capture, stack trace and other debugging information needs to be provided from the software application itself The other information can be provided by the alarm routing engine 12. For example, the alarm routing engine 12 can provide time stamp, time zone and address information.

The alarm routing engine 12 inserts the information described above into the email message either as text or as attachments. For example, the screen capture and stack trace are preferably added as attachments in a compressed form as known in the art.

In a preferred embodiment the text within the email message is encoded using extensible mark up language (XML) and the contact center 16 comprises an XML parser together with a SAX interface. Any suitable XML parser may be used as known in the art. The XML parser is able to recognise XML tags and elements in an XML document and can also ensure that an XML document is correctly formatted. SAX (Simple API for XML) is a publically agreed application programming interface (API) which interfaces to XML parsers and is publically available at www.saxproject.org. It acts as a tool for triggering the invocation of certain API methods when an XML file is being parsed. When SAX sees certain "events" such as the start tag of an XML element, one of the API methods is invoked. This API method reads the text described by the tag and takes action based on what is there, Once the alarm routing engine 12 has formed the email message containing the information mentioned above, this email message is forwarded to the contact center 16 via an email server 18 as known in the art. The email server 18 has pre-specified information about the address of the contact center 16 or alternatively this information is provided by the alarm routing engine 12.

At the contact center the email message is received. Considering now the embodiment in which the email message is encoded in XML and the contact center has an XML parser and a SAX interface, then the contact center uses the XML parser to process the email contents.

The SAX API is pre-configured at the contact center such that particular tags or items in the email message trigger specified actions. For example, the module ID item or tag in the email message is arranged to result in a method call to read what the module ID is and then identify from a pre-specified mapping, which skill set is appropriate for that module ID. The method would then involve forwarding the email message to the queue for that skillset or to an available agent within the skillset.

In another example the contact center is arranged to automatically provide different levels of service to different customers. For example, in this case some customers have pre-arranged a premium level of service with the contact center provider whilst others have pre-arranged a "best efforts" level of service. A tag in the XML file of the email is arranged to be associated with specified methods according to the level of service required. For example, the system ID from the email can be used as input to a mapping table at the contact center to decide which level of service to provide. If a premium level of service is specified then the methods invoked by the SAX interface can be arranged to route the email to the first available appropriate agent, bypassing any queues.

Figure 3:
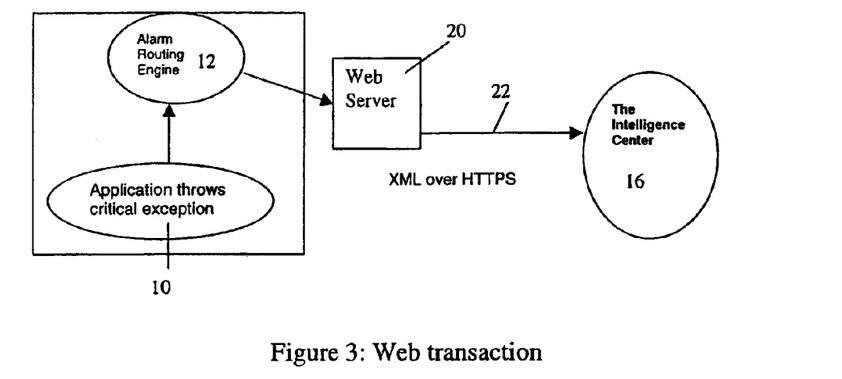
FIG. 3 is a schematic diagram of the arrangement of FIG. 1 in the case that web-based contact is made to the contact center.

In another example, web-based methods are used to initiate communication with the contact center. This is illustrated in FIG. 3. In this case the communications server 14 is provided as a web server 20 and communication is made to the contact center 16 using XML over HTTPS (hyper text transfer protocol secure).

In this example the software error code and any other information as mentioned above for the email example, is encapsulated as an XML file by the alarm routing engine 12. This XML file is passed to the web server 20 which uses secure HTTP (hyper text transfer protocol) to transmit the XML file to the contact center 16 (see arrow 22 in FIG. 3). The contact center in this example comprises a web-based interface arranged to receive and interpret the XML file. For example, the contact center 16 comprises an XML parser and a SAX interface as mentioned above and these are used to extract information from the XML file and route the message to an appropriate agent or skillset.

Figure 4:
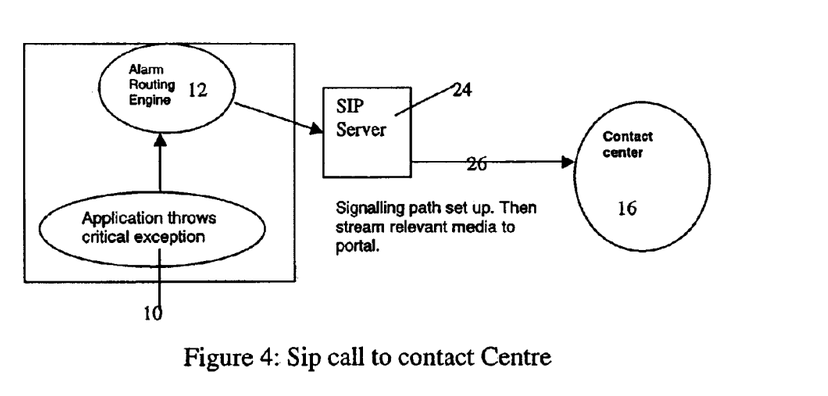
FIG. 4 is a schematic diagram of the arrangement of FIG. 1 in the case that a session initiation protocol (SIP) call is set up with the contact center.

In another embodiment a two-way communication session is established between the contact center and a communications server associated with the software application requiring support. Preferably the two-way communication session is a session initiation protocol (SIP) communication session as illustrated in FIG. 4.

In this case the communication server 14 is a SIP server 24 and a two way communications session 26 is set up between the SIP server 24 and the contact center 16 in order to enable information to be exchanged between the contact center 16 and the software application 10 being supported.

The software application 10 being supported outputs a software error code and the alarm routing engine 12 sends a request to the SIP server 24 to set up a SIP session with the contact center 16. The request comprises information about the software error and any other information as discussed above with respect to the email example. The SIP server 24 forwards the request to set up a SIP session to the contact center following the SIP process as known in the art. When the contact center receives this request, a SIP client at the contact center is able to act appropriately to set up the SIP session. Information about the software error code and any other suitable information is taken from the request message by the contact center and used to identify an appropriate skillset. Once an appropriate agent within that skillset becomes available the SIP session is set up between that agent and the SIP server 24 at the customer site.

At this point it is possible for the agent to initiate a remote maintenance session of the software being supported at the customer site. This is achieved using the SIP session that has been set up. This enables the agent to view an active trace for example from the site where the software being supported is located. This helps the agent in the debugging process and provides information that would not otherwise be available. In addition, the SIP session can be used to pass other information to the agent. For example, information about the last known activity of the user interface at the site where the software being supported is located, or configuration data for hardware and software at the customer site.

Figure 5:
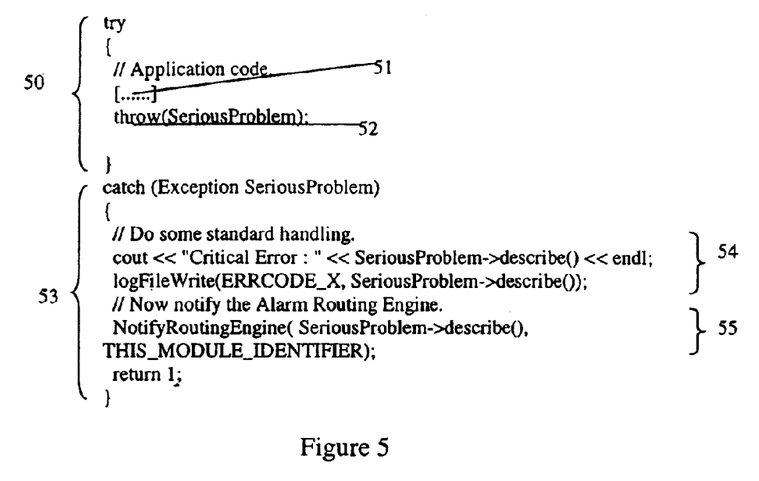
FIG. 5 is a pseudo code example of software for incorporation in the software to be supported.

As mentioned above the software being supported needs to be arranged to output software error codes. Most existing software applications are already provided in this way because use of software error codes is a conventional technique for debugging and maintenance of computer software. However, it is also possible to tailor the software being supported such that it provides other information in addition to the software error codes. For example, the software can be arranged to output software module identifiers as mentioned above and in other embodiments outputs details of the address of the contact center. In that case, the alarm routing engine is not required because the software is able to send its own communication message to the contact center. For example, FIG. 5 shows a pseudo code example of code for use in the software being supported.

The first section of the pseudo code comprises a "try" operand 50; such operands are known in the art. In this section application code 51 is executed and in the event of a fault, error or other specified event an exception object is created using the "throw" operand 52. In this example it is an object of the class "SeriousProblem". Execution resumes at the matching "catch" operand 53 for this software error, and some standard error handling 54 is carried out. This involves writing a software error code and a description of the problem to a log file. The code then goes on to notify the alarm routing engine. A description of the problem and details of the software module in which the error or event occurred (see 55 in FIG. 5) are sent to the alarm routing engine. Thus in this example, the software being supported uses an alarm routing engine 12. However, this is not essential. It is also possible for the software being supported to simply send details of the software error code directly to a contact center without the need for an alarm routing engine.

Figure 6:
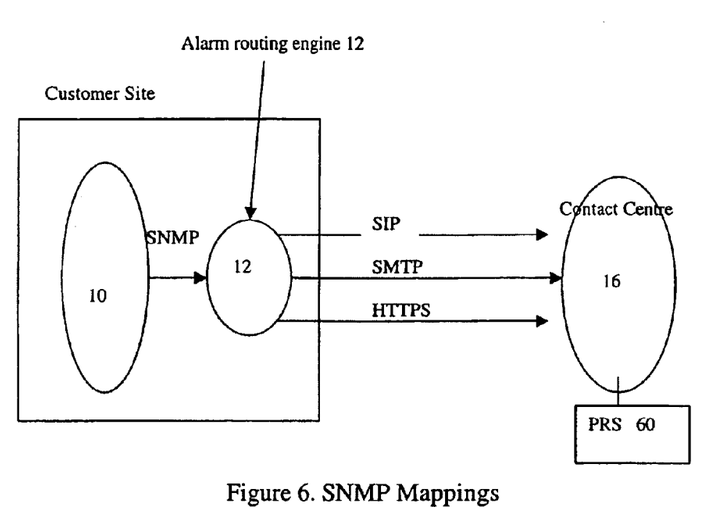
FIG. 6 is a schematic diagram of an embodiment in which an alarm routing engine in used and in which the contact center is associated with a problem report system.

In the case that existing software applications which already provide software error codes are used it is advantageous to use an alarm routing engine 12. This is illustrated in FIG. 6. The software application 10 is arranged to output software error codes in a standardised format such as SNMP (simple network management protocol) as known in the art. The alarm routing engine communicates with the customer software application 10 (using any suitable method, such as SIP, SMTP (simple mail transfer protocol) or HTTPS) and initiates the interface with the contact center 16 as shown. An advantage of this approach is that the customer software application 10 does not need to be modified.

In another embodiment the contact center 16 either comprises or has access to a problem reporting system (PRS) 60 (see FIG. 6) A PRS is a tool for recording information about customer problems with products such as software and for keeping track of what actions are taken to resolve those problems. An example of a PRS is ClearQuality as currently commercially available from Amdocs Limited (trade mark).

Advantageously, the contact center is arranged not only to route incoming calls to appropriate agents using the software error codes and other information, but also to automatically make an entry in the associated PRS. Alternatively, once the call has been routed within the contact center to an appropriate agent, that agent is able quickly and easily to make the entry in the associated PRS.

In the examples discussed above either the contact center or the alarm routing engine have access to a pre-specified mapping between software error codes (and optionally also software module identifiers) and agent skillsets. In a preferred embodiment this information is automatically exported from every new release of the software being supported 10 in a pre-defined format. This information is sent to the alarm routing engine or the contact center automatically. For example, the contact center receives the information about software error codes and module identifiers and maps this directly to the skillsets. In this case the software module identifier or error code can actually be a skillset.

Any range or device value given herein may be extended or altered without losing the effect sought, as will be apparent to the skilled person for an understanding of the teachings herein.

The invention claimed is:

1. In a contact center comprising a plurality of skillsets each with an associated queue, a method of automatically routing an incoming contact to one of the queues, said method comprising the steps of:
   (i) receiving the incoming contact, said contact being associated with a software application and comprising information about an event that has occurred during execution of that software application;
   (ii) routing the incoming contact to one of the queues on the basis of the information about the events;
   wherein the information about the event comprises at least one of a software error code and a software module identifier.

2. A method as claimed in claim 1 wherein said step (ii) of routing further comprises accessing a pre-specified mapping between the queues and information about events that may occur during execution of the software application.

3. A method as claimed in claim 2 wherein said pre-specified mapping is provided by the software application.

4. A method as claimed in claim 2 wherein said pre-specified mapping is extracted automatically from the software application.

5. A method as claimed in claim 1 wherein said incoming contact comprises a communications message in a form selected from: email, a web-based communications message, a session initiation protocol communications message, fax, a conventional telephone call, a wireless telephone call, a voice over internet protocol telephone call and a text message.

6. A method as claimed in claim 1 wherein said incoming contact comprises an extensible mark-up language (XML) file, said method further comprising:
   parsing said XML file using an XML parser at the contact center;
   executing pre-specified methods on the basis of the results of the XML parsing process and a SAX interface at the contact center.

7. A method as claimed in claim 1 which further comprises sending information about the event from the contact center to an associated problem report system.

8. A method as claimed in claim 1 wherein said incoming contact comprises information selected from: information about a time when the event occurred, information about a time zone in which the software application exists, information about a customer location at which the software application is provided, address information of the software application, a stack trace and a screen capture.

9. A method as claimed in claim 1 which further comprises establishing a two-way communication session with an entity from which the incoming contact was received.

10. A method as claimed in claim 9 which further comprises carrying out remote maintenance of the entity from which the incoming contact was receive using the two-way communication session.

11. A computer program arranged to control a contact center in order to carry out the method of claim 1.

12. A contact center comprising:
(i) a plurality of skillsets each with an associated queue;
(ii) an input arranged to receive an incoming automatic contact, said contact being associated with a software application and comprising information about an event that has occurred during execution of that software application, the information about the event comprising at least one of a software error code and a software module identifier; and
(iii) a routing engine arranged to route the incoming contact to one of the queues on the basis of the information about the event.

13. A method of automatically sending a contact request to a contact center, said method comprising the steps of:
obtaining information about an event that has occurred during execution of a software application, the information about the event comprising at least one of a software error code and a software module identifier;
forming a contact request comprising said obtained information about the event; and
sending said contact request to a pre-specified contact center.

14. A method as claimed in claim 13 which is carried out by the software application itself.

15. A method as claimed in claim 13 which is carried out by an alarm routing engine arranged to be connected to the software application.

16. A method as claimed in claim 13 which further comprises setting up a two-way communication session with the pre-specified contact center.

17. A computer program arranged to control an alarm routing engine in order to carry out the method of claim 13.

18. An alarm routing engine arranged to automatically send a contact request to a contact center, said alarm routing engine comprising:
an input arranged to obtain information about an event that has occurred during execution of a software application, the information about the event comprising at least one of a software error code and a software module identifier;
a processor arranged to form a contact request comprising said obtained information about the event; and
an output arranged to send the contact request to the contact center.

* * * * *